E. C. WASHBURN.
AXLE CONSTRUCTION.
APPLICATION FILED JULY 11, 1918.
1,289,582.
Patented Dec. 31, 1918.
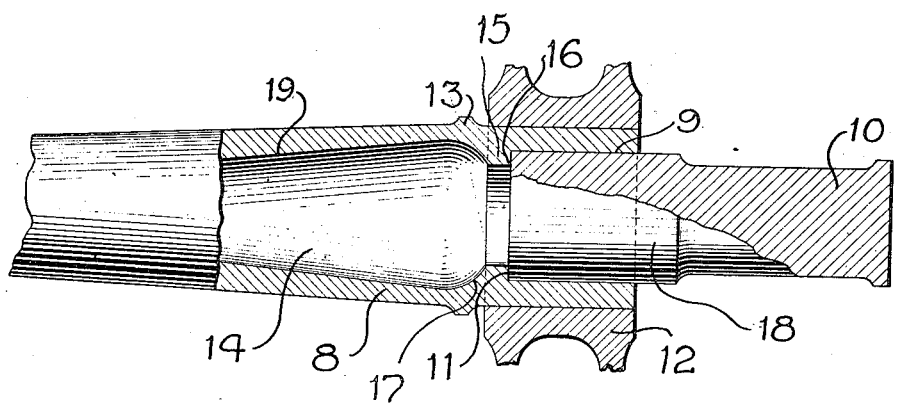
Inventor

UNITED STATES PATENT OFFICE.

EDWIN C. WASHBURN, OF ENGELWOOD, NEW JERSEY.

AXLE CONSTRUCTION.

1,289,582.   Specification of Letters Patent.   Patented Dec. 31, 1918.

Continuation of application Serial No. 230,623, filed April 25, 1918. This application filed July 11, 1918. Serial No. 244,344.

*To all whom it may concern:*

Be it known that I, EDWIN C. WASHBURN, a citizen of the United States, and a resident of Engelwood, in the county of Bergen and State of New Jersey, whose post-office address is 2 Wall street, N. Y. C., have invented an Improvement in Axle Constructions, of which the following is a specification.

This invention relates to car axle construction. One of the objects thereof is to provide a construction of the above type which shall effectively resist the bending and breaking stresses encountered in use. Another object is to provide a construction of the above nature which shall be strong and dependable in use, yet relatively light in weight, and of simple construction. Other objects will be in part obvious, and in part pointed out hereinafter.

The invention accordingly consists in the features of construction and arrangement of parts as will be herein illustratively described and set forth in the appended claims.

This case is a continuation of copending application, Ser. No. 230,623, filed April 25, 1918, as to all subject matter common to the two.

In the accompanying drawings in which is shown one of various possible embodiments of the several mechanical features of this invention, The figure is a view in longitudinal section of a portion of a car axle with a portion of a wheel partially cut away.

Referring now to the drawings, there is provided an axle, preferably of cast steel, having preferably a minimum diameter at its center and tapering outwardly, as shown.

The end of the axle portion is preferably cylindrical in form as shown at 9, and of a diameter preferably substantially equal to the maximum diameter of the tapered portion.

The axle is preferably formed hollow, as shown, with a tapered opening 14 continuous with a cylindrical opening in the cylindrical portion 9. A circular shoulder 15, is preferably formed at the interior of the cylindrical portion and adjacent to the tapered portion. This shoulder preferably provides a surface 16 at right angles to the cylindrical surface.

The bore 14 within the tapered axle is preferably made of greater taper than the exterior of said axle portion as indicated at 19. By this means the metal thickness of the axle portion is greatest near its center and becomes gradually smaller as the end of the shaft is approached. It is noted that by the tapered construction the greater shaft diameter found near the car wheel provides greater strength and stiffness at the part where the greatest stress is applied. As this strength and stiffness are dependent on an integral power of the diameter, a lesser thickness of metal at such portion of greater diameter is sufficient to provide the increased strength desired at such point. The bore is preferably narrowed at 17 to run into the shoulder 15.

Within the opening in cylindrical portion 9, there is preferably fitted the stub end 18 of journal portion 10, which may be formed of metal better adapted to resist wear than the body of the axle. This extension rests at its inner end against the shoulder or ledge 16.

A car wheel 12 is tightly forced preferably by hydraulic pressure over the exterior of the cylindrical portion 9, until it reaches an exterior shoulder 13, cast integral with the shaft.

The thickness of the car wheel preferably extends over the entire joint between the axle portion and the journal portion, as well as shoulder 15, thus aiding in the strength of the connection.

In use, if the journal portion should become worn, it is merely necessary to force the car wheel off the axle, to remove the journal portion and to insert a new journal portion within the cylindrical opening 9 preferably shrinking it in place. Thereupon the car wheel may be replaced and the entire axle will be fit for use again.

It will thus be seen that I have herein provided a construction which will meet the requirements of use.

As various changes might be made in the above construction without departing from the essence of the invention, it is to be understood that all matter herein described or shown in the accompanying drawings, is to be interpreted as illustrative, and not in a limiting sense.

Having thus set forth the preferred embodiment of my invention, I claim:

1. In car axle construction, in combination, a hollow main axle portion, a journal portion fitting therein, and a shoulder for limiting the extent of insertion of said journal portion.

2. In car axle construction, in combination, a hollow main axle portion, a journal portion fitting in an end thereof, and a shoulder in the interior of said main portion for limiting the extent of insertion of said journal portion.

3. In car axle construction, in combination, a hollow main axle portion, an integral ledge in the interior thereof, and a journal portion fitting in said axle portion and against said ledge.

4. In car axle construction, in combination, a hollow cast car axle member shaped to have a maximum strength at a point adjacent the wheel and a journal portion inserted within said member at its end and embraced thereby.

5. In car axle construction, in combination, a hollow car axle having its walls of tapering thickness and having fitted within its ends substantially solid journal portions.

6. In car axle construction, in combination, a hollow cast car axle having its walls of tapering thickness and provided with a cylindrical portion embraced by the wheel hub and separate journal portions fitted within its ends.

7. In car axle construction, in combination, a hollow main axle portion, tapered outwardly from near its center, and having an integral hollow cylindrical portion at its end, a shoulder in said cylindrical portion, and a journal portion fitting therein and against said shoulder.

8. In car axle construction, in combination, a hollow main axle portion of greater diameter at its ends than at its center, and with a thickness of metal at its outer end smaller than that near its center.

9. In car axle construction, in combination, a hollow main axle portion having its smallest diameter near its center and tapered outwardly, said hollow portion having the greatest thickness near its center, the thickness tapering outwardly.

10. In car axle construction, in combination, a main axle portion, tapered outwardly from a minimum diameter near its center, said portion having a substantially concentric bore of greater taper and a journal portion fitting in said axle portion.

11. In car axle construction, in combination, a main axle portion, tapered outwardly from a minimum diameter near its center, and cylindrical at its ends, a substantially concentric bore in said axle portion of greater outward taper and cylindrical at its ends, and a journal portion fitting in said cylindrical bore.

12. In car axle construction, in combination, a main axle portion tapered outwardly from a minimum diameter near its center and cylindrical at its ends, a substantially concentric bore in said axle portion of greater outward taper and cylindrical at its ends, an integral ledge in said bore near the junction of said tapered and said cylindrical portion, and a journal portion fitting in said cylindrical bore and against said ledge.

13. In car axle construction, in combination, a hollow car axle of increasing diameter in the direction of the wheel and having fitted within its outer end a solid journal portion.

14. In car axle construction, in combination, a journal portion, a hollow main axle portion embracing said journal portion, an integral ledge in the interior limiting the amount of insertion of said journal portion, and a car wheel mounted on said axle portion and embracing said ledge and the entire length common to said axle portion and said journal portion.

15. In car axle construction, in combination, a journal portion, a tapered hollow axle portion, cylindrical at its outer end, a shoulder in said cylindrical portion, said cylindrical portion embracing said journal portion up to said shoulder, and a car wheel mounted on said axle portion, and embracing the entire length common to said axle portion and said journal portion, as well as said shoulder.

16. In car axle construction, in combination, a main axle portion tapered outwardly from a minimum diameter near its center, a substantially concentric bore in said axle portion of greater outward taper, said axle portion having a hollow cylindrical portion continuous with said tapered portion, a journal portion of metal better adapted to resist wear fitting within said cylindrical bore, and a car wheel embracing said cylindrical portion over the length common to said axle portion and said journal portion.

17. In car axle construction, in combination, a hollow cast car axle of progressively varying inside diameter and substantially solid journal portions fitted within its ends and shaped to limit their inward movement therein.

18. In car axle construction, in combination, a hollow car axle of non-uniform cross section progressively increasing in strength in the direction toward the wheel and journal portions fitted within its ends and shaped to limit their inward movement therein.

In testimony whereof, I have signed my name to this specification this 8th day of July, 1918.

EDWIN C. WASHBURN.